United States Patent
Henderson et al.

(10) Patent No.: US 9,920,992 B2
(45) Date of Patent: Mar. 20, 2018

(54) MOLTEN METAL SCRAP SUBMERGENCE APPARATUS

(71) Applicant: PYROTEK, INC., Solon, OH (US)

(72) Inventors: Richard S. Henderson, Solon, OH (US); Jason Tetkoskie, Aurora, OH (US); Chris T. Vild, Cleveland Heights, OH (US)

(73) Assignee: PYROTEK, INC., Spokane, WA (US)

( * ) Notice: Subject to any disclaimer, the term of this patent is extended or adjusted under 35 U.S.C. 154(b) by 118 days.

(21) Appl. No.: 14/394,961

(22) PCT Filed: Apr. 16, 2013

(86) PCT No.: PCT/US2013/036727
§ 371 (c)(1),
(2) Date: Oct. 16, 2014

(87) PCT Pub. No.: WO2013/158607
PCT Pub. Date: Oct. 24, 2013

(65) Prior Publication Data
US 2015/0069679 A1 Mar. 12, 2015

Related U.S. Application Data

(60) Provisional application No. 61/624,609, filed on Apr. 16, 2012.

(51) Int. Cl.
*F27B 3/16* (2006.01)
*F27B 3/18* (2006.01)
(Continued)

(52) U.S. Cl.
CPC .............. *F27B 3/16* (2013.01); *C22B 9/16* (2013.01); *C22B 21/0092* (2013.01); *F27B 3/18* (2013.01);
(Continued)

(58) Field of Classification Search
CPC ......... C22B 21/0092; C22B 9/16; F27B 3/16; F27B 3/18; F27B 3/19; F27D 27/00; Y02P 10/218; Y02W 30/54
(Continued)

(56) References Cited

U.S. PATENT DOCUMENTS 4,913,735 A 4/1990 Palmer
5,304,771 A 4/1994 Griffin et al.
(Continued)

FOREIGN PATENT DOCUMENTS

CN 2088108 U 11/1991
GB 2269889 A 2/1994
(Continued)

OTHER PUBLICATIONS

PCT International Search Report from PCT/US2013/036727, dated Sep. 30, 2013, from the European Patent Office, 11 pp.
Supplementary Europesan Search Report, EP12796442.

*Primary Examiner* — Scott Kastler
*Assistant Examiner* — Michael Aboagye
(74) *Attorney, Agent, or Firm* — Fay Sharpe LLP

(57) ABSTRACT

A metal scrap submergence device comprising an open top chamber including walls of a heat resistant material, an inlet positioned in a side wall of the chamber, an outlet positioned in the base of said chamber, and a ramp adjacent said side wall of the chamber. The side wall further includes a feature affecting molten metal flow. The feature can include, for example, a baffle, a vane, a passage, a diverging or converging shape and combinations thereof. Similarly, the molten metal flow can be affected by slanting the ramp inwardly or outwardly.

16 Claims, 6 Drawing Sheets

(51) Int. Cl.
  *F27B 3/19*   (2006.01)
  *C22B 9/16*   (2006.01)
  *F27D 27/00*  (2010.01)
  *C22B 21/00*  (2006.01)

(52) U.S. Cl.
  CPC ............... *F27B 3/19* (2013.01); *F27D 27/00* (2013.01); *Y02P 10/218* (2015.11)

(58) Field of Classification Search
  USPC ... 266/236, 44, 901, 216, 233, 275, 45, 200; 75/687, 686, 375, 708
  See application file for complete search history.

(56) References Cited

U.S. PATENT DOCUMENTS

| | | | | |
|---|---|---|---|---|
| 6,036,745 | A * | 3/2000 | Gilbert | .................... C22B 7/003 266/233 |
| 6,217,823 | B1 * | 4/2001 | Vild | ........................ C22B 7/003 266/216 |
| 2005/0017417 | A1 | 1/2005 | Grayson | |
| 2006/0180963 | A1 | 8/2006 | Thut | |
| 2008/0202290 | A1 | 8/2008 | Chesonis et al. | |
| 2008/0307927 | A1 | 12/2008 | Dupuis et al. | |

FOREIGN PATENT DOCUMENTS

| | | |
|---|---|---|
| JP | H0867923 A | 3/1996 |
| WO | 9950466 | 10/1999 |
| WO | 9951884 | 10/1999 |
| WO | 200505421 A1 | 6/2006 |
| WO | 2013006852 A2 | 1/2013 |

* cited by examiner

MOLTEN METAL SCRAP SUBMERGENCE APPARATUS

BACKGROUND

This invention relates to an improved method and apparatus for melting metal scrap such as aluminum. However, this disclosure is not limited to use with aluminum, but rather, is relevant to all molten metals.

Aluminum scrap can be divided into two general categories. The first category of scrap is comprised of large parts such as internal combustion engine parts which are generally self-submerging. The second category of scrap is termed lightweight scrap such as shredded food and beverage containers or machining chips and filings. The lightweight scrap is difficult to submerge and thus is difficult to melt.

Conventional melting systems for lightweight scrap have the problem that the floating scrap can build up in the melting bay, seriously interfering with the efficiency of the process. Such conventional systems also lead to higher levels of skim formation and melt loss resulting from the floating aluminum scrap that is converted to oxide and free aluminum metal that is occluded in the skim. In addition to the melt loss, high levels of skim require more intense processing downstream to separate these materials in order to provide purified metal.

U.S. Pat. No. 4,128,415 discloses a system for melting metal scrap in a molten media which includes a housing generally cylindrical in cross section and having upper and lower portions. Metal scrap is introduced to a body of molten melting media contained in the upper portion of the housing. A supply of molten melting media is added to the upper portion of the housing through a volute located in the lower portion. The molten melting media is supplied or added by action of an impeller located in the lower portion and mounted on a drive shaft extending through the upper portion. Vanes are mounted on the drive shaft to control the flow motion of the body of molten melting media and metal scrap in the upper portion of the housing by creating a vortex in this body for purposes of mixing the molten melting media and the metal scrap.

U.S. Pat. No. 3,997,336 discloses a system for melting metal scrap in a molten melting media which comprises a housing having an upper portion wherein the melting media and scrap are brought together to initiate melting. The housing also has a lower portion in which a volute is located. An impeller, having a central hub, a circumferential band surrounding the hub, and canted vanes projecting radially from the hub to the band, is positioned in the lower portion of the housing to cooperate with the volute so that upon rotation of the impeller, metal scrap and stem melting media are moved downwardly and out of the housing.

U.S. Pat. No. 4,518,424 discloses a method of melting metal scrap in a molten melting media. The method comprises the steps of providing a body of molten melting media in a housing having an upper portion and a lower portion, the lower portion having a generally cylindrical wall section. A supply of metal scrap is added to the housing and a supply of molten melting media is introduced to the upper portion of the housing. Melting of the metal scrap is initiated by ingesting it and directing the molten melting media downwardly in the housing by action of an impeller positioned in the lower portion, the impeller having a flat ring member having an opening in the center thereof and having blades extending from said ring member to a substantially circular disc member.

U.S. Pat. No. 4,486,228 discloses a method of melting metal scrap in a molten melting media. The method comprises the steps of providing a body of molten melting media in a housing having an upper portion and a lower portion, the lower portion having a generally cylindrical wall section. A supply of metal scrap is added to the housing and a supply of molten melting media is introduced to the upper portion of the housing. Melting of the metal scrap is initiated by ingesting it and molten melting media downwardly in the housing by action of an impeller positioned in the lower portion, the impeller having a flat ring member having an opening in the center thereof and having blades extending from said ring member to a substantially circular disc member. The scrap and melting media enters the opening in the ring member in an axial direction and is propelled therefrom in a radial direction by use of the blades. The impeller is positioned in the cylindrical wall section such that at least the ring member cooperates therewith to move the scrap and melting media from the upper portion through said impeller while substantially avoiding recirculation of the molten melting media within the housing to the upper portion.

U.S. Pat. No. 4,437,650 discloses an apparatus for melting relatively large floating units of metal scrap in a molten melting media or medium, the units having oxide films and solid, liquid and gaseous inclusions. After the units are charged into a melting medium, layers of freshly melted metal are presented to the molten media. The apparatus includes a bay for heating the molten media and means for pumping the media from the heating bay to a circular bay for receiving the large units of metal scrap.

U.S. Pat. No. 4,286,985, the disclosure of which is herein incorporated by reference, discloses a vortex melting system for ingesting and melting metal scrap that otherwise tends to float on the surface of a molten melting media. The method includes the steps of providing a supply of the melting media and directing the media from the supply to an upper portion of a receptacle having an outlet opening in the lower portion thereof. The flow of the melting media entering the receptacle produces a vortex of the media in the receptacle, as the media flows out the lower opening. The amount of the flow of the melting media to the receptacle and the size of the lower opening are such that a predetermined level of the media is maintained in the receptacle.

U.S. Pat. Nos. 6,036,745; 6,074,455; and 6,217,823 also describe metal scrap submergence devices. The disclosures of each of these patents is herein incorporated by reference.

BRIEF DESCRIPTION

According to a first embodiment, a metal scrap submergence device comprising an open top chamber including walls of a heat resistant material, an inlet positioned in a side wall of the chamber, an outlet positioned in the side wall or base of said chamber, and a ramp adjacent the side wall of the chamber is provided. The side wall further includes a feature affecting molten metal flow. The feature can include, for example, a baffle, a vane, a passage, a diverging or converging shape and combinations thereof.

According to a second embodiment, a metal scrap submergence device comprising an open top chamber including walls of a heat resistant material is provided. The chamber includes an inlet positioned in a side wall and an outlet positioned in the base. A ramp comprising a ledge extends from the side wall of the chamber. The ledge includes an at least generally upward facing surface that is either inwardly or outwardly slanted.

According to a further embodiment, a metal scrap submergence device comprising an open top chamber including walls of a heat resistant material, and an inlet positioned in one of a side wall and a base of the chamber is described. An outlet is positioned in the base of the chamber. A ramp comprising a ledge extends from the side wall. The ledge includes an at least generally upward facing surface that is either inwardly or outwardly slanted. The chamber side wall further includes at least one of a baffle, a vane, a passage in fluid communication with a dross well, a change in diameter adjacent said ramp, and combinations thereof.

DETAILED DESCRIPTION

Reference will now be made in detail to various embodiments of the invention, examples of which are illustrated in the accompanying drawings. While the invention will be described in connection with the depicted embodiments, it will be understood that it is not intended to limit the invention to those embodiments. On the contrary, it is intended to cover all alternatives, modifications, and equivalents as may be included within the spirit and scope of the invention defined by the appended claims.

The present invention is directed to a scrap submergence system of the type typically employed in metal recycling processes, such as, the recycling of aluminum. In the recycling of metals, it is necessary to melt scrap pieces for treatment and processing. A large portion of aluminum scrap pieces are thin walled as a result of the mechanical shaping action from which they are formed, such as, shaving, boring and cold rolling. Melting thin walled scrap pieces is particularly difficult because rapid submerging in molten metal is severely hampered by the fact that thin walled scrap pieces float on molten metal. Problematically, extended exposure to the hostile atmosphere in a traditional melting furnace results in extremely high oxidation loss In a typical melting operation used to convert lightweight scrap to ingot, a melting furnace is provided with an enclosed hearth and a connected open sidewell. Usually the sidewell is divided into a pump well and a melting bay. A pump or other molten metal flow inducing apparatus is positioned externally to the melting bay (e.g., in the pump well), and causes molten metal to flow from the hearth to the melting bay. Typically the melting bay is further divided into a charge well and a drosswell. Metal scrap pieces are fed into the melting bay, particularly the charge well component thereof. Floating dross is skimmed from the surface of the molten metal in the dross well.

Figure 1:
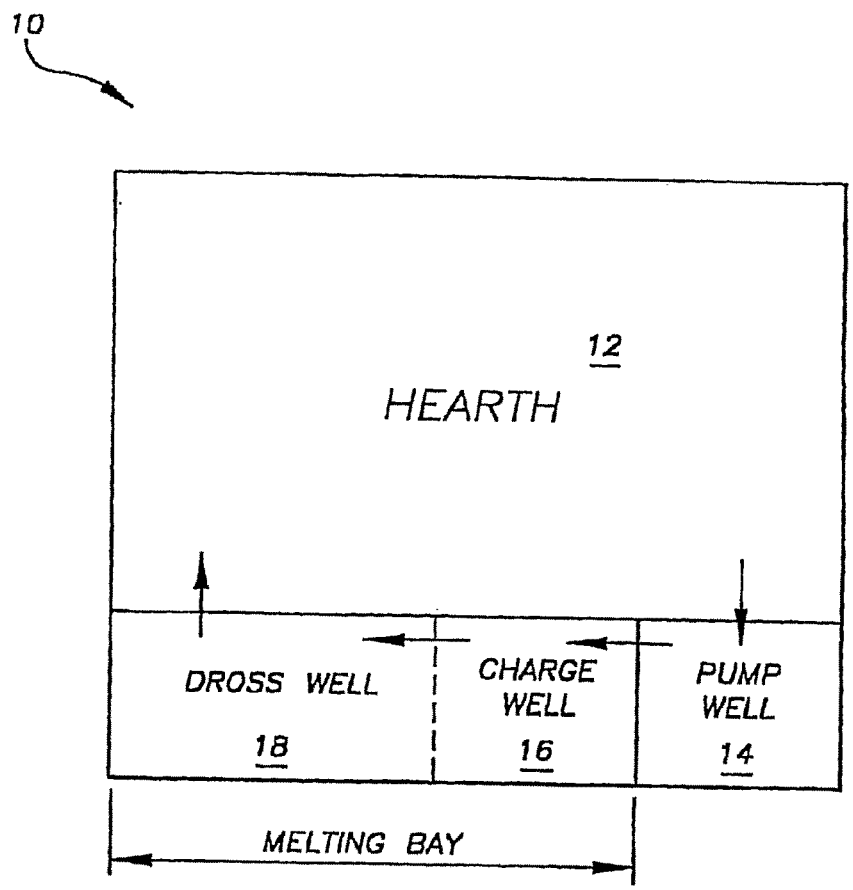
FIG. 1 is a schematic representation of a traditional molten metal recycling furnace.

Referring now to FIG. 1, an aluminum recycling furnace 10 is depicted. Furnace 10 includes a main hearth component 12 which is heated, for example, with gas or oil burners or by any other means known in the art. Adjacent, and in fluid communication (typically submerged archways) with the hearth 12, is the primary recycling area comprised of a pump well 14, a charge well 16 and a dross well 18. Although not shown, the wall of hearth 12 opens to the pump well 14, the pump well opens to the charge well 16, the charge well opens to the dross well 18, and the dross well opens to the hearth 12 to allow the circulation pattern shown by the arrows. The pump well can include a molten metal pump of any type known to those skilled in the art. Alternatively, the well and pump can be replaced by an electromagnetic pump, for example. The molten metal pump circulates molten metal from the hearth 12 to the charge well 16 where scrap chips of the metal to be recycled are deposited onto the surface of the melt. The charge well is also a location where additional metal or fluxes can be added to achieve a desired alloy. Molten metal from the charge well 16 flows into the dross well 18 wherein impurities in the form of dross are skimmed from the surface before the melt flows back into the hearth 12. This particular invention is directed to an improved design of the charge well 16.

The charge well can comprise an open top chamber including walls constructed of a heat resistant material. The chamber includes an inlet positioned in a side wall (alternatively in the base) and in fluid communication with the pump well and an outlet positioned in its opposed side wall and in fluid communication with the dross well (however the exit of molten metal through the chamber bottom wall with an internal conduit forming to a side exit is feasible). Generally, the internal form of the chamber can be described as a bottom or low side wall inlet, a bottom outlet with a ramp formed adjacent the side wall.

According to a first embodiment, the ramp can comprise a ledge extending from the charge well side wall toward the center of the chamber. The metal scrap submergence device can be constructed in a manner which positions the bottom edge of the ramp on the base of the chamber adjacent the inlet. The ledge can include an at least generally upward facing surface. The upward facing surface can include a first end (bottom edge) engaging the base and a second end elevated above the base. The upwardly facing surface can have a width between, for example, 5% and 33% of the chamber diameter. Accordingly, if two opposed upwardly facing surfaces are considered, the overall area could be 66%. The ledge can further include an at least substantially horizontal wall extending from an edge of the upwardly facing surface opposite the sidewall to the chamber base and helping to define an outlet. The horizontal wall may be inwardly or outwardly inclined. Alternatively, the upwardly facing surface may engage an inner wall forming an outlet to the chamber at an edge opposed to the side wall. The top edge of the wall can be at approximately the same height as the terminal edge of the ramp.

According to a further embodiment, the ramp can also comprise a sloped surface that travels a full 360° around the chamber and extends at an incline from the base to the side wall effectively forming a cone shaped chamber base.

The ramp can spiral through at least 180°, 270°, 320°, or the entire chamber circumference. The ramp upwardly facing surface can include a portion having a slope of about 5°, or 10° to 15°. However, it should be understood that the extent of the ramp around the chamber circumference can vary significantly and the slope can vary throughout the dimensions of the ramp.

Figure 2:
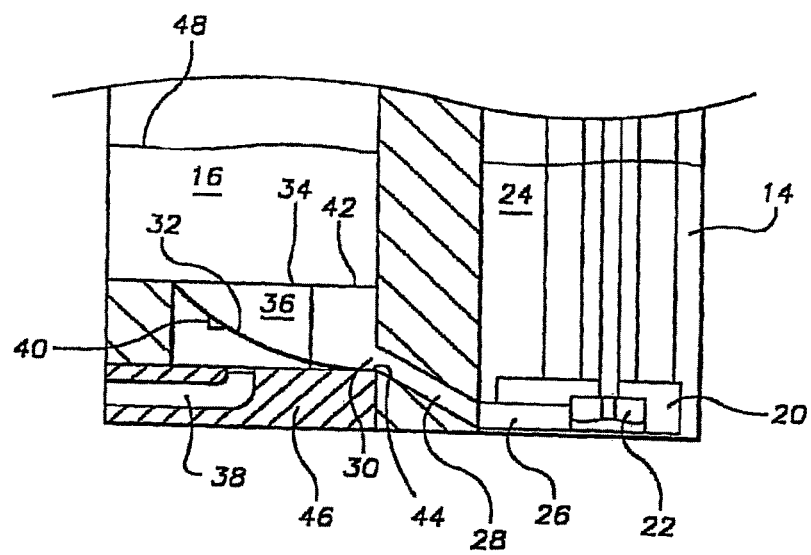
FIG. 2 is a cross-sectional view of a traditional pump well and charge well of the furnace of FIG. 1.

Referring now to FIG. 2, the pump well 14 and charge well 16 of FIG. 1 is displayed. Pump 20 is positioned in pump well 14 and draws molten aluminum from the hearth 12 forcing it into the charge well 16. More particularly, the rotation of impeller 22 draws molten aluminum from the bath 24, into the pump 20 and forces it through outlet 26, up passage 28, and through inlet 30 into the charge well 16. Molten aluminum flows up the ramp 32 within charge well 16, spilling over an inner edge 34 into cavity 36, and exits through outlet 38. The leading edge 44 of the ramp 32 can be positioned adjacent the inlet 30.

While it is a beneficial that the ramp 32 be sloped, this does not need to be achieved by a constant incline. Rather, ramp 32 can be sloped over a first 180° portion 40, and remain horizontal over the final about 120° portion 42. Accordingly, the invention is intended to encompass all versions of a sloped ramp. Similarly, the invention is intended to encompass a ramp covering from as little as 45° of the circumference of the charge well 16 to 360°. However, a ramp extending between 180° and 270° is typical.

Because the present invention is applicable as a component for remodeling existing charge wells, it can be noted from FIG. 2 that the design includes a base section 46 of refractory material which elevates the cavity 36 to provide clearance for an outlet 38 and allows molten metal to flow into the dross well 18 of FIG. 1. As is recognized by those of ordinary skill in the art, metal chips being recycled are deposited onto the surface of the melt 48 in charge well 16.

Turning now to a brief reference of the scrap submergence device of U.S. Pat. No. 6,217,823, as shown in FIG. 2, it is noted that a highly commercially successful system is depicted. Moreover, the system shown therein has been found to facilitate the turnover of up to 20,000 lbs./hr. of molten aluminum. Obviously, the ability of a furnace to circulate the molten aluminum throughout the hearth to achieve introduction of scrap and desired alloying compounds is directly tied to the economic output of that furnace.

To increase furnace turnover, the molten metal pump component (in FIG. 2) can be run at higher RPM. Similarly, a larger molten metal pump can be employed. However, it has been found that the charge well (16 in FIG. 2) does not take full advantage of such an increased molten metal flow because the vortex formed therein may injest more air which in turn results in increased melt loss. Moreover, it has been found that simply increasing the flow of molten metal output by the pump into the charge well may not improve scrap submergence because it may change the optimal shape of the vortex formed therein. Furthermore, because of the space constraints in typical furnace structures, the ability to increase the charge well dimension to install a larger submergence bowl to take advantage of higher pump throughput is not always a viable option.

It has also been learned that the charge well 16 has a relatively "dead zone" adjacent its outer wall. As used herein the term dead zone represents an area in which molten metal rotates within the chamber but only a limited portion enters the vortex and cavity 36. The dead zone is problematic because it reduces the effective submergence area for added scrap and provides a quantity of molten metal that fails to circulate through the hearth, decreasing energy efficiency and raising BTU requirements for the system.

Figure 4:
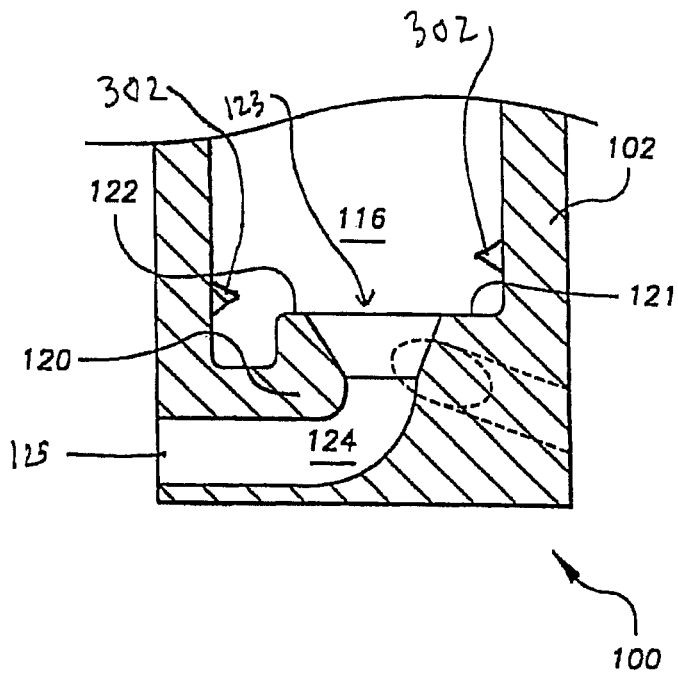
FIG. 4 is a cross-sectional view of the charge well of FIG. 3.
Figure 3:
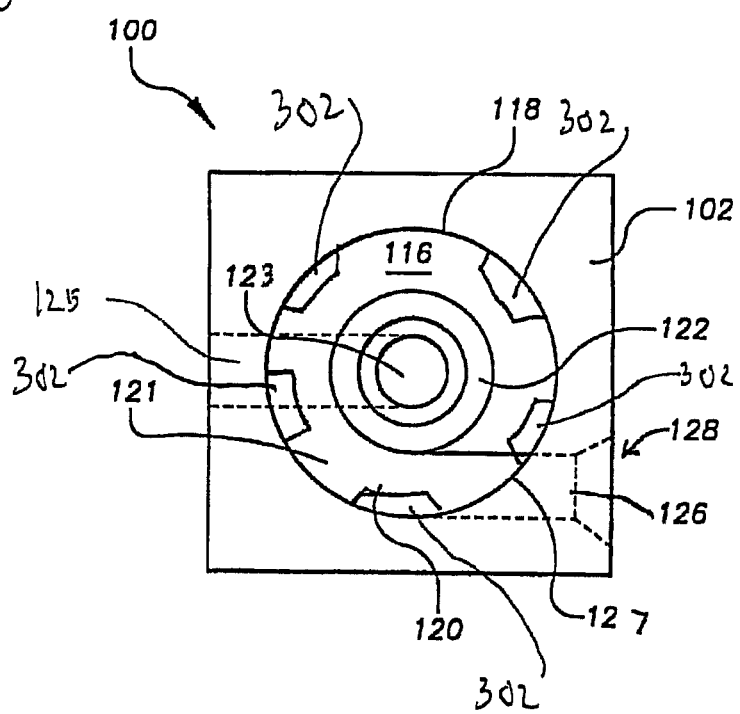
FIG. 3 is a top plan view, partially in cross-section of a first embodiment of an inventive charge well.

Referring now to a first embodiment of the invention, reference is made to FIGS. 3 and 4. In this embodiment, a scrap melting device 100 is comprised of a block of refractory material 102 which is constructed of a size suited to provide a relatively close tolerance mating with the dimensions of an existing charge well (e.g. charge well 16 of FIG. 1). Preferably, the block 102 is constructed of a cured material such as an alumina-silica refractory or other castable refractory material known to those skilled in the art. In a preferred form of the invention, the surfaces of the cast body will be treated with boron nitride prior to heat treatment. Block 102 includes a chamber 116 having generally cylindrical side wall 118, a base 120 including ramp 121, with an inner wall 122 forming a centrally located cavity 123 leading to outlet 124 and outlet duct 125. Ramp 121 again begins with a leading edge 127 adjacent the inlet 126 to the chamber 116. In this instance, inlet 126 includes a tapered opening 128.

A flow-disruptive baffle 302, in the form of a wing or vane for example, is included on the wall of the chamber 116. More particularly, a plurality of baffles 302 are dispersed around the circumference of the chamber walls. It is envisioned that the baffle can be continuous, can comprise multiple baffles spaced evenly or unevenly around the circumference of the chamber, and can be at one or various heights within the chamber. Generally speaking, the baffle may have a downwardly inclined lower surface such that molten metal flowing from a center of the chamber 116 is directed downwardly. Alternatively, in the case of a chamber wherein molten metal flow is predominantly upward against the wall 118 of the chamber 115, it may be desirable for the baffle to be downwardly inclined from its location on the wall toward its end proximate the chamber 116 center. Similarly, it may be desirable for the baffle to be downwardly inclined in its longitudinal extent in the direction of molten metal rotating within chamber 116. In this regard, the desired feature of the baffle is to drive molten metal downward in the chamber. The baffle of U.S. Pat. No. 6,036,745 provides one example.

Figure 5:
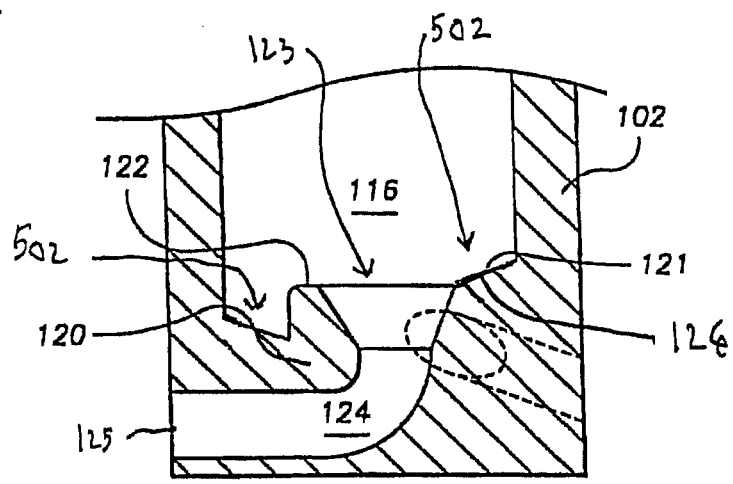
FIG. 5 is a cross-sectional view of an alternative embodiment of the inventive charge well.

Turning next to FIG. 5, it has been found that providing ramp 121 with an inward slant 502 can help advantageously disrupt the dead zone surrounding the walls of the mixing chamber via an inward fold of metal as it travels up the ramp. As used herein inward refers to a ramp having a high edge adjacent the chamber side wall and a relatively lower edge closer to the center of the chamber. An outward slant refers to a ramp having the opposite orientation. Inward and outward can generally be considered throughout this disclosure to refer to the relative position between chamber side wall and chamber center.

Figure 6:
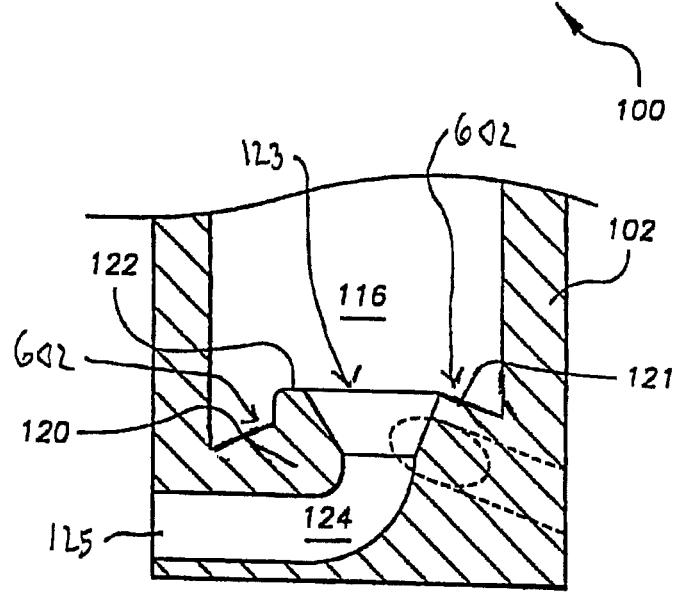
FIG. 6 is a cross-sectional view of an further alternative embodiment of the inventive charge well.

Turning next to FIG. 6, it has been similarly found that, providing ramp 121 with an outward slant 602 can help advantageously disrupt the dead zone surrounding the walls of the mixing chamber via an outward fold of metal as it travels up the ramp. More particularly, the surface 126 which is horizontal in the device of FIG. 2 is inclined inwardly or outwardly in the designs of FIGS. 5 and 6, respectively.

It is noted that the slant of the ramp is not necessarily continuous. Moreover, it can slant in regions and remain horizontal in regions. Furthermore, the degree of slant can vary.

Figure 7:
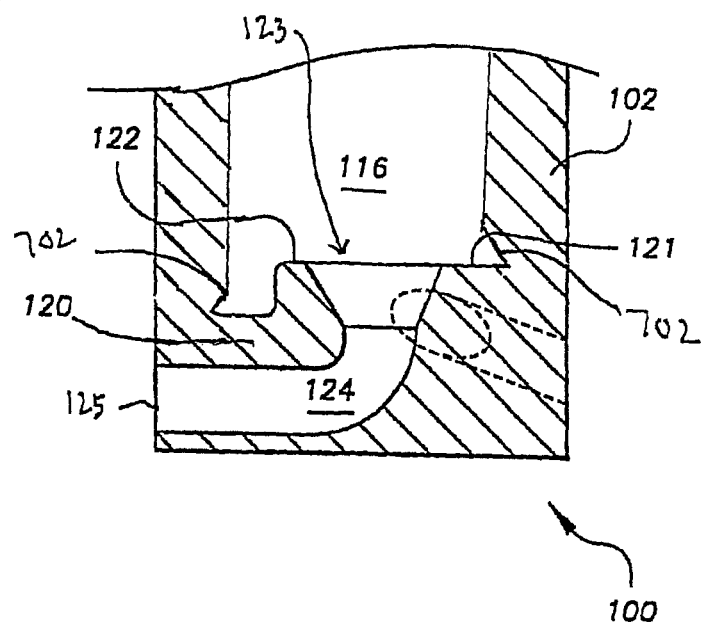
FIG. 7 is a cross-sectional view of a fourth alternative embodiment of the inventive charge well.

Turning next to FIG. 7, it is similarly believed that providing the side walls of chamber 116 with an inward slope 702 (converging) adjacent its interface with the ramp 121 can provide a helpful gentle turbulence in the dead zone adjacent the outer walls of the chamber 116.

Figure 8:
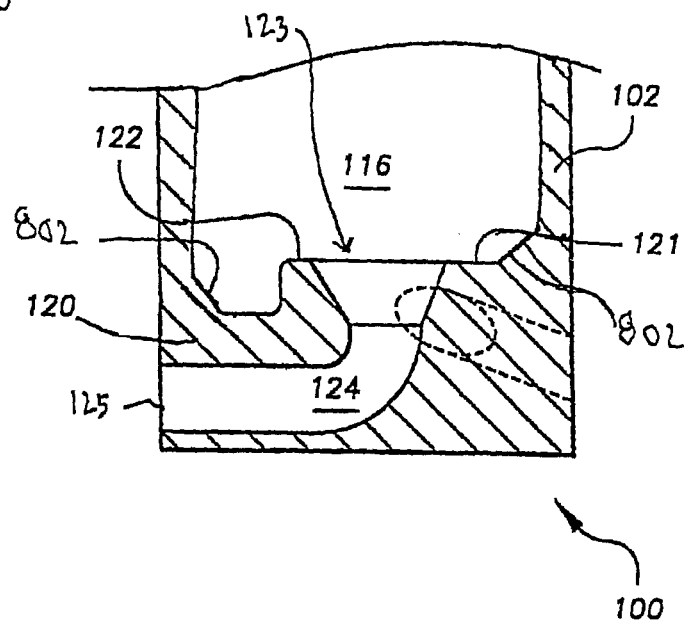
FIG. 8 is a cross-sectional view of a fifth alternative embodiment of the inventive charge well.

Turning next to FIG. 8, it is similarly believed that providing the side walls of chamber 116 with an outward slope 802 (diverging) adjacent the ramp 121 can provide a helpful gentle turbulence in the dead zone adjacent the outer walls of the chamber 116. Moreover, with reference to FIGS. 7 and 8, it is believed that providing the side wall of chamber 116 with a change in diameter adjacent the ramp 121 can be advantageous. The change in diameter can be continuous or discontinuous throughout the circumference of the chamber.

Although the inward and outward slope of the side walls is depicted as only extending for a limited range above the ramp, it is envisioned that the slope could continue as high as necessary to achieve gentle disturbance in the dead zone. Similarly, it is noted that the incline of the walls is not necessarily continuous throughout the extent of the walls, nor is its shape and/or slope necessarily constant.

With reference to FIGS. 3-8, it is noted that a combination of slanted ramp, sloped chamber walls and baffle (s) could be utilized.

Figure 9:
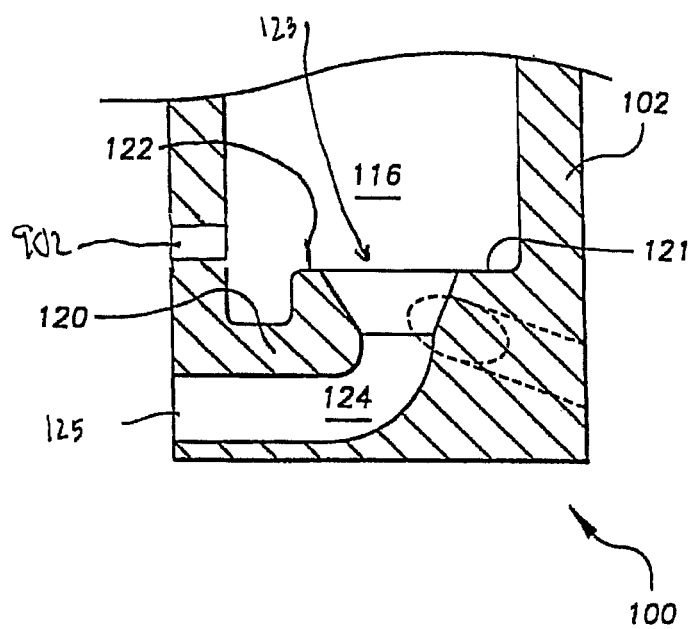
FIG. 9 is a cross-sectional view of a sixth alternative embodiment of the inventive charge well.
Figure 10:
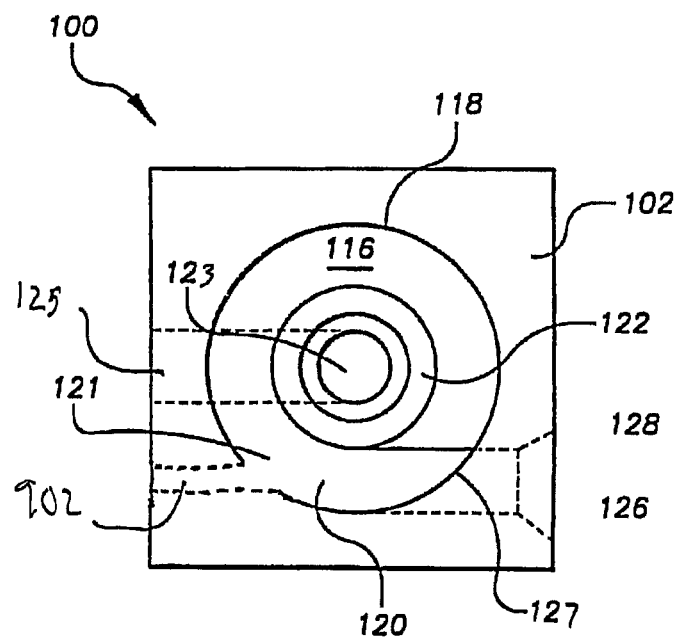
FIG. 10 is a top plan view of the charge well of FIG. 9.

Turning next to FIGS. 9 and 10, it is considered potentially advantageous to provide a relatively small port 902 passing through block 102 with direct communication into dross well 18. The port 902 can be at any height within the scrap melting device, such as slightly higher than the highest edge of the ramp 121. Moreover, it is envisioned that port 902 could facilitate the transfer of molten metal from the dead zone adjacent the walls of charge well 16 and create flow therein. In addition, port 902 can improve circulation between the chamber and dross well, which in turn improves burner to hearth bath heat transfer, allowing molten metal returning to the charge well to be at an elevated temperature. This can reduce residence time in the charge well, while maintaining a suitable vortex adjacent the center of the charge well.

It is envisioned that the features of FIGS. 3-8 directed to reducing an outer wall dead zone could be combined in any manner deemed appropriate by the skilled artisan with the discharge port of FIGS. 9 and 10.

Figure 11:
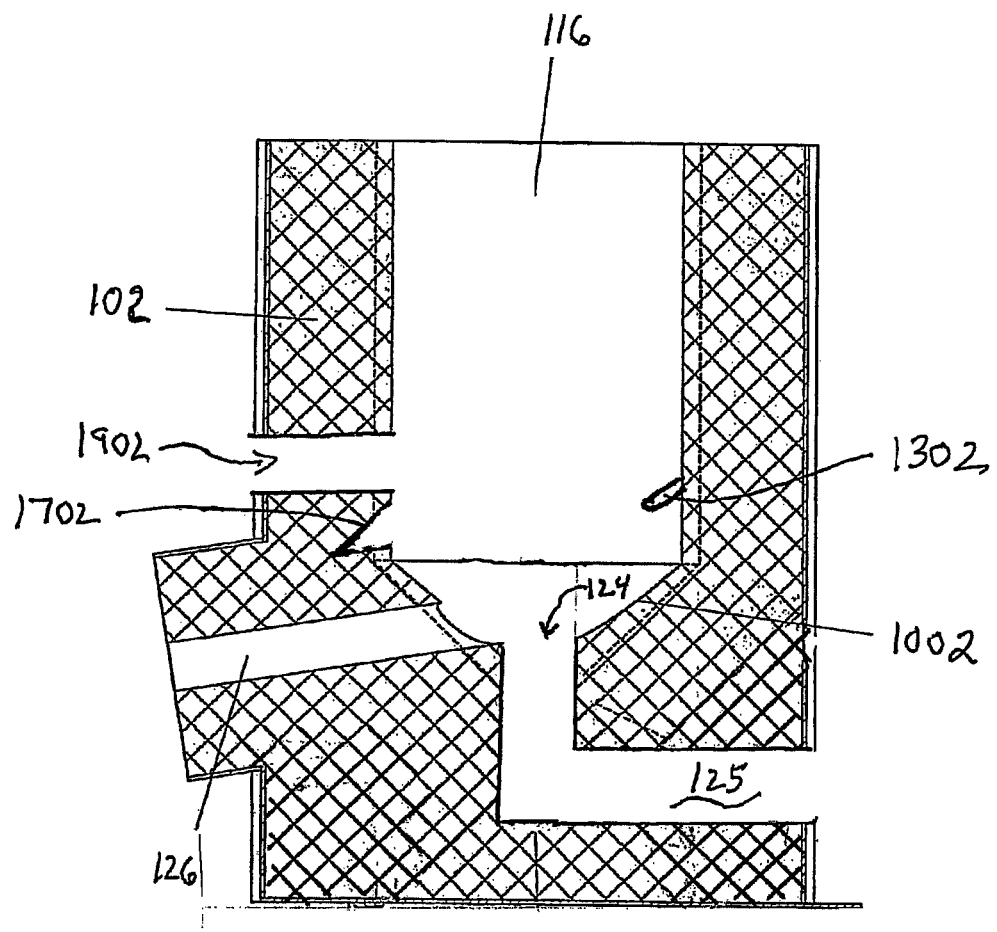
FIG. 11 is a cross-sectional view of a further alternative embodiment wherein the shape of the charge wall is modified.

Turning next to FIG. 11, it is demonstrated that the features of the present disclosure including diverter(s), passages and shaped sidewalls adjacent the interface with the ramp can be utilized in association with an alternatively shaped ramp. Particularly, a 360° ramp 1002 having a relatively constant slope from the chamber base to a side wall, effectively forming a cone shape can similarly include a baffle 1302, or inwardly shaped side wall 1702, or a passage 1902 communicating with a dross well and/or the pump well.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A metal scrap submergence device comprising an open top chamber including walls of a heat resistant material, an inlet positioned in a side wall of the chamber, an outlet positioned in the base wall of said chamber, and a ramp adjacent said side wall of the chamber, said ramp comprising a sloped surface extending from said base to said side wall forming a ledge extending from the side wall having a first end engaging the base and a second end terminating above the base, the ledge extending through at least 180° of chamber circumference, the side wall further including a feature disposed adjacent the ramp for influencing molten metal flow, said feature selected from a baffle, a vane, a diverging or converging side wall shape, and combinations thereof.

2. The device of claim 1 wherein said feature comprises at least one baffle extending toward a center of said chamber from said side wall.

3. The device of claim 2 wherein said baffle is spaced above said ramp.

4. The device of claim 2 wherein said baffle extends continuously around the side wall.

5. The device of claim 2 comprising a plurality of baffles spaced apart on said side wall.

6. The device of claim 5 wherein at least two of said baffles are located at different heights within said chamber.

7. The device of claim 2 wherein said baffle comprises an inclined surface facing the base of said chamber.

8. A metal scrap submergence device comprising an open top chamber including walls of a heat resistant material, an inlet positioned in a side wall of the chamber, an outlet positioned in the base or side wall of said chamber, and a ramp adjacent said side wall of the chamber comprising a sloped surface extending from said base to said side wall forming a ledge extending from said side wall, the side wall further including a a feature for influencing molten metal flow, said feature comprising passage in fluid communication with a dross well, said passage disposed above the inlet and the ramp.

9. The device of claim 1 wherein said ramp comprises a sloped surface extending from said base to said side wall.

10. The device of claim 1 wherein said ledge extends from between 180° and 270° of the chamber circumference.

11. The device of claim 10 wherein said ramp has an inclined slope of between about 5 and 15° between said first and said second end.

12. The device of claim 1 wherein at least generally upward facing surface of the ledge extending from said side wall is one of inwardly or outwardly inclined.

13. The device of claim 1 wherein said feature comprises at least a portion of the side wall being one of inwardly or outwardly inclined adjacent said ramp.

14. A metal scrap submergence device comprising an open top chamber including walls of a heat resistant material, an inlet positioned in a side wall of the chamber, an outlet positioned in a base wall of said chamber, a ramp comprising a 5° to 15° sloped surface extending from said base to said side wall forming a ledge extending from said side wall, the ledge extending through at least 180° of chamber circumference, said ledge includes an at least generally upward facing surface, said surface being either inwardly or outwardly slanted, said device further including a feature for influencing molten metal flow, said feature comprising at least one of a baffle, a vane, and a diverging or converging side wall shape.

15. The device of claim 14 wherein said ledge includes a first edge engaging said side wall and a second edge engaging an inner wall defining said outlet.

16. The device of claim 8 wherein said passage has a diameter less than a diameter of said outlet.

* * * * *